(12) United States Patent
Waggoner et al.

(10) Patent No.: US 10,743,004 B1
(45) Date of Patent: *Aug. 11, 2020

(54) SCALABLE VIDEO CODING TECHNIQUES

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/255,064

(22) Filed: Sep. 1, 2016

(51) Int. Cl.
*H04N 19/30* (2014.01)
*H04L 29/06* (2006.01)

(52) U.S. Cl.
CPC ............ *H04N 19/30* (2014.11); *H04L 65/607* (2013.01)

(58) Field of Classification Search
CPC . H04L 12/18; H04L 65/4076; H04L 12/1886; H04N 19/597; H04N 21/6125; H04N 21/64738; H04N 13/0048; H04N 19/30; H04N 19/187; H04N 19/167; H04N 19/159; H04N 13/0011; H04N 19/174; H04N 21/2353; H04N 21/42653; G06T 19/006; G06T 2207/20021; H04W 24/08
USPC ..... 375/240.02, 240.12, 240.26; 348/39, 43; 725/104
See application file for complete search history.

(56) References Cited

U.S. PATENT DOCUMENTS

| | | | |
|---|---|---|---|
| 2003/0172131 A1* | 9/2003 | Ao | H04N 7/17318 709/219 |
| 2010/0329358 A1* | 12/2010 | Zhang | H04N 19/597 375/240.26 |
| 2011/0001792 A1* | 1/2011 | Pandit | G06T 15/205 348/43 |
| 2012/0023155 A1* | 1/2012 | Myers | H04N 21/234327 709/203 |
| 2012/0036544 A1* | 2/2012 | Chen | H04N 19/597 725/109 |
| 2013/0060911 A1* | 3/2013 | Nagaraj | H04N 21/234327 709/219 |
| 2013/0215220 A1* | 8/2013 | Wang | H04N 13/261 348/43 |
| 2013/0222539 A1* | 8/2013 | Pahalawatta | H04N 13/0048 348/43 |
| 2014/0028793 A1* | 1/2014 | Wiegand | H04N 19/513 348/42 |
| 2014/0032719 A1* | 1/2014 | Panwar | H04L 65/607 709/219 |
| 2014/0241415 A1* | 8/2014 | Su | H04N 19/142 375/240.02 |
| 2015/0016544 A1* | 1/2015 | Wang | H04N 19/52 375/240.25 |

(Continued)

OTHER PUBLICATIONS

U.S. Appl. No. 15/255,062, filed Sep. 1, 2016, Waggoner et al.

(Continued)

*Primary Examiner* — Daniel Chang
(74) *Attorney, Agent, or Firm* — Weaver Austin Villeneuve & Sampson LLP (57) ABSTRACT

Techniques are described that enable virtual reality content to be delivered using a video codec that operates according to a scalable video encoding standard. These techniques include selectively downloading and decoding frames of video content.

19 Claims, 7 Drawing Sheets

(56) References Cited

U.S. PATENT DOCUMENTS

| | | | | |
|---|---|---|---|---|
| 2015/0234455 A1* | 8/2015 | LaValle | ................ | G02B 27/017 345/8 |
| 2015/0237166 A1* | 8/2015 | Denoual | ............ | H04N 21/6332 709/217 |
| 2015/0334407 A1* | 11/2015 | Rusert | .................... | H04N 19/70 375/240.12 |
| 2016/0065993 A1* | 3/2016 | Tanizawa | ............. | H04N 19/119 375/240.26 |
| 2016/0080833 A1* | 3/2016 | Denoual | ........ | H04N 21/234327 725/116 |
| 2016/0112730 A1* | 4/2016 | De Vleeschauwer | ....................... | H04L 29/06326 725/110 |
| 2016/0192029 A1* | 6/2016 | Bergstrom | .......... | H04L 12/1886 725/109 |
| 2016/0217760 A1* | 7/2016 | Chu | ......................... | G06T 1/20 |
| 2016/0219325 A1* | 7/2016 | Chu | ................ | H04N 21/42653 |
| 2016/0227191 A1* | 8/2016 | Rabii | .................... | H04W 24/08 |
| 2016/0381398 A1* | 12/2016 | Saxena | ............. | H04N 21/2353 348/39 |
| 2017/0084086 A1* | 3/2017 | Pio | ....................... | H04N 21/816 |
| 2017/0223368 A1* | 8/2017 | Abbas | .................. | H04N 19/146 |
| 2017/0244948 A1* | 8/2017 | Pang | ..................... | H04N 5/2226 |
| 2017/0347026 A1* | 11/2017 | Hannuksela | ........... | H04N 19/00 |
| 2017/0347084 A1* | 11/2017 | Boyce | .................... | H04N 19/30 |
| 2018/0041764 A1* | 2/2018 | Lin | ..................... | H04N 19/174 |

OTHER PUBLICATIONS

U.S. Office Action dated Jun. 8, 2018 issued in U.S. Appl. No. 15/255,062.
U.S. Final Office Action dated Jan. 28, 2019 issued in U.S. Appl. No. 15/255,062.
U.S. Office Action dated Jun. 27, 2019 issued in U.S. Appl. No. 15/255,062.
U.S. Final Office Action dated Jan. 8, 2020 issued in U.S. Appl. No. 15/255,062.

* cited by examiner

SCALABLE VIDEO CODING TECHNIQUES

BACKGROUND

Virtual reality is a computer technology that replicates an environment, real or imagined, and simulates a user's physical presence in the environment and, in some cases, enables the user to interact with the environment. Typically, virtual reality content is displayed on a computer monitor or with a virtual reality device such as a virtual reality headset, which is also commonly referred to as a head-mounted display. The user may interact with the environment by interacting with the virtual reality device, through the use of a standard input device such as a keyboard or mouse, or through a multi-modal device such as a wired glove. As the user interacts with the environment, three-dimensional (3D) images are provided by virtual reality software that accesses virtual reality content.

A number of streaming media services enable multimedia such as movies and television programs to be streamed to client devices. However, since much more visual information needs to be available to simulate a user's presence in a 3D environment, streaming virtual reality content is particularly challenging.

DETAILED DESCRIPTION

This disclosure describes techniques that enable a virtual reality (VR) environment to be displayed using a scalable video encoding standard such as the Scalability extension of High Efficiency Video Coding (HEVC), which is commonly referred to as SHVC. In accordance with various implementations, virtual reality content is streamed over a network to a client device in the form of base layers and enhancement layers that can improve the frame rate, resolution, or quality of video rendered at the client device. By encoding and displaying virtual reality content using a scalable encoding standard, a virtual reality environment may be simulated at a client device using fewer bits and with fewer disruptions to the streaming of the virtual reality content.

Telecommunications networks and other content services commonly stream video to client devices for display on televisions and computer monitors. With the increase in availability of three-dimensional (3D) virtual reality content, some content services offer the streaming of 3D virtual reality content. Since the virtual reality content offers a user the ability to view their virtual environment from a number of viewer-selected perspectives, the amount of data that is typically streamed to offer this capability is significant.

Virtual reality content can be stored locally on a computer or virtual reality device or, alternatively, virtual reality content can be streamed to the computer or virtual reality device over the Internet. To enable the virtual reality content to be displayed at different resolutions, the virtual reality content is typically encoded in separate video files that correspond to the different resolutions. As a result, when a client device switches between two different streams, this can be visually jarring to a user.

To generate a 3D virtual reality environment, a virtual cube, cylinder, or other three-dimensional shape is typically used to display images of the virtual reality environment as they would be perceived by a user within the virtual reality environment. For a given user position or perspective within the virtual reality environment, there will often be 6 (or more) possible views corresponding to the faces of the three-dimensional shape, which can be rendered separately or simultaneously. More particularly, an image may be generated and displayed for each of the faces of a virtual cube, rectangle, cylinder, or other three-dimensional shape that would be visible from the perspective of the user within the virtual reality environment at a given point in time.

Generally, when a user interacts with a virtual reality environment, the user's change in position and/or perspective is detected by the client device and virtual reality data reflecting the user's changed perspective is then downloaded and decoded by the client device. This data typically includes the data for all faces of the virtual three dimensional object used to simulate the virtual reality environment at the user's new position. Since the amount of virtual reality data that is downloaded to the client device can be substantial and the data is downloaded after the user's changed position is detected, the available bandwidth and processing resources may be insufficient to generate and display images at the speed with which the user's position within their virtual environment changes. As a result, the user can perceive disruptions to the video presented at the client device.

Figure 1:
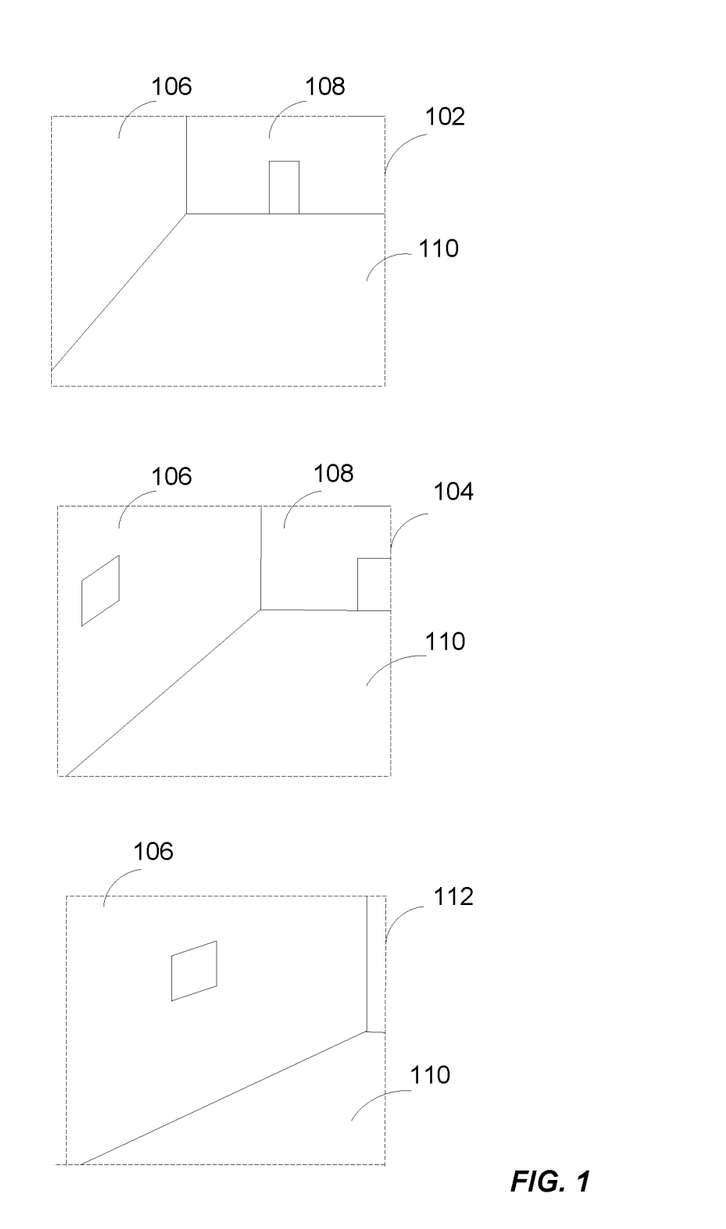
FIG. 1 illustrates an example of an application of a particular implementation.

FIG. 1 illustrates an example of an application of a particular implementation. In this example, virtual reality software installed on a virtual reality device enables a user to walk through a virtual room. Virtual reality content need not be decoded for all possible views. Moreover, base layer frames may be decoded separately from enhancement layer frames. Therefore, images may be presented rapidly as the user walks through the virtual room while minimizing the amount of data that is processed at the virtual reality device.

As shown at 102, as the user looks through the lenses of the virtual reality device, the user perceives himself to be in a room that includes a door. The virtual reality software decodes base layer frames for the views corresponding to the faces of the cube that are visible to the user. In this example, there are three views that are visible to the user, which correspond to three faces of the cube. More particularly, the views that are visible to the user include wall 106, wall 108, and floor 110. In addition, the virtual reality software may decode base layer frames that are likely to be viewed within a period of time to ensure that the virtual content is rendered without delays or disruptions. In some implementations, the virtual reality software decodes, for the user's current position within the virtual reality environment, base layer frames corresponding to all faces of the cube. The virtual reality software renders images corresponding to the decoded base layer(s) for the views that are visible to the user.

The user may walk or move while holding or wearing the virtual reality device. Similarly, the user may rotate or tilt the virtual reality device. As the user's position or perspective changes, the user perceives his position or perspective within the room to change.

As the user rotates left while holding or wearing the virtual reality device, the user's perspective within the virtual room changes, as shown at 104. More particularly, a painting on wall 106 becomes visible, while the door on wall 108 moves out of view. The virtual reality device detects the user's change in position/perspective, decodes the base layers for the views corresponding to the faces of the cube that are visible from the user's current position/perspective, and decodes enhancement layer(s) for at least one of the faces of the cube that are in view. In this example, a quality enhancement layer for the view corresponding to wall 106 is decoded, enabling the details of the painting on wall 106 to come into focus. The virtual reality software decodes the enhancement layer, an image is generated from the recently decoded base layers and the enhancement layer, and the image is rendered via the virtual reality device.

The user continues to rotate left, as shown at 112. The virtual reality device decodes base layers corresponding to the user's new position/perspective and decodes a quality enhancement layer for the view corresponding to wall 106.

The virtual reality device may predict that the user will continue to rotate left within the virtual room. Thus, the virtual reality device may continue to decode base layers and enhancement layer(s) for the faces of the cube that will be in view from the user's anticipated location/perspective(s) within the virtual room. Since the quality of a view may be incrementally improved by decoding enhancement layers for that view, the quality of the image displayed by the virtual reality device may be enhanced rapidly.

The example described above pertains to decoding of virtual reality content. In accordance with various implementations, virtual reality content may also be selectively downloaded. More particularly, virtual reality content need not be downloaded for all possible views. Moreover, base layer frames may be downloaded separately from enhancement layer frames. Therefore, images may be rendered rapidly while minimizing the amount of data that is downloaded and stored at the virtual reality device.

Figure 2:
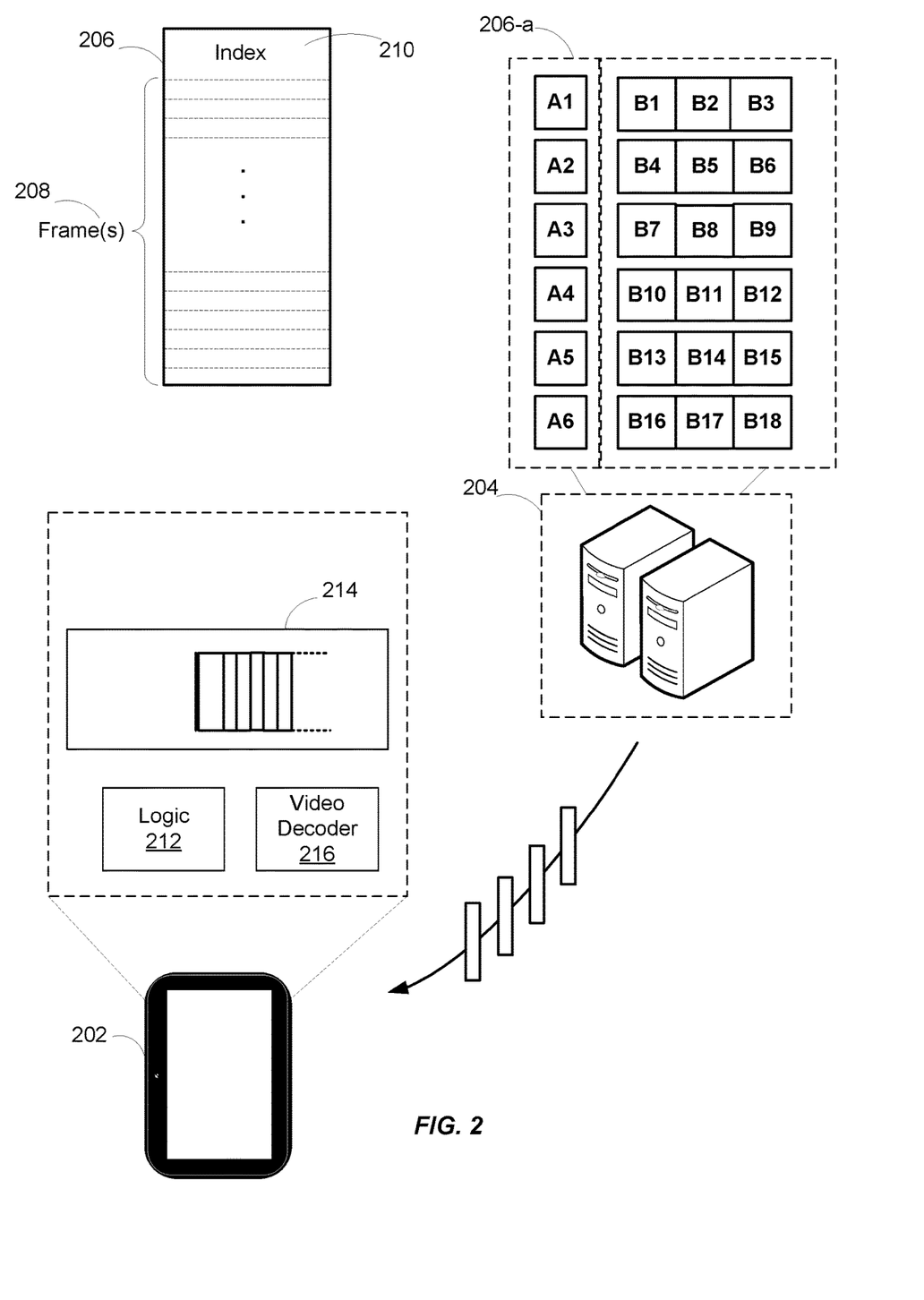
FIG. 2 illustrates the operation of an example of a particular implementation.

FIG. 2 illustrates the operation of an example of a particular implementation. A user of client device 202 browses a catalogue of virtual reality titles available from service 204. When the user selects one of the virtual reality titles, content service 204 streams virtual reality content corresponding to the selected virtual reality title to client device 202. The streaming of virtual reality content to client device 202 is facilitated by virtual reality software installed on client device 202. The virtual reality software operates to provide 3D virtual reality content via a display that is integrated with client device 202 (as shown) or coupled to client device 202, as will be described in further detail below.

Service 204 maintains files associated with the virtual reality titles available from service 204 that enable virtual reality content to be streamed to client devices using service 204. In this example, service 204 selects file(s) 206 that are relevant to the selected virtual reality title. File 206 is a video file that includes frames 208 that have been encoded by a video encoder that operates according to a scalable video encoding standard such as SHVC. In another implementation, virtual reality content may be generated and encoded dynamically.

As shown in FIG. 2, each file 206 can include one or more media fragments. Each media fragment includes a fragment index 210 and frame(s) 208. In this example, file 206-*a* corresponding to the selected virtual reality title can include a plurality of base layers, where each of the base layers corresponds to a different one of a plurality of views of the virtual reality content from a particular position or perspective in the virtual environment. More particularly, each of the base layers may correspond to a different face, side, or view of a three-dimensional shape such as a cube or cylinder centered on or including that position. Each base layer can include one or more frames. To simplify the example, each base layer is shown to include a single frame. Each of the base layer frames A1-A6 is shown to have a corresponding set of enhancement layer frames, B 1-B3, B4-B6, B7-B9, B10-B12, B13-B15, and B16-B18, respectively, that can be used separately or in combination to enhance the virtual reality video that is rendered via client device 202. For example, a set of enhancement layer frames for a given base layer can include one or more temporal enhancement layer frames, one or more spatial enhancement layer frames, and/or one or more quality enhancement layer frames. Using a scalable coding technique such as HSVC, temporal, spatial, and quality enhancement layers can be combined with base layers into a single multi-layer stream.

To further illustrate the advantages of the disclosed implementations, the three different types of enhancement layers will be described in further detail. A temporal enhancement layer can be used to increase the frame rate of video projecting 3D virtual reality content. For example, a base layer may produce video at 15 frames per second (fps). Where the client device is in a network with lower bandwidth, the client device may choose not to download a temporal enhancement layer. However, where the client device is in a network having a higher bandwidth, the client device may choose to download a temporal enhancement layer frame. By downloading and decoding both the base layer and temporal enhancement layer, the client device may receive virtual reality content at a higher frame rate. For example, by combining the base layer and a temporal enhancement layer, the virtual reality content may be presented at a frame rate of 30 fps.

A spatial enhancement layer can be used to increase the resolution of the decoded video. For example, the resolution of virtual reality content provided by a base layer may be 720×480. By combining the base layer and a spatial enhancement layer, the resolution of the decoded virtual reality content may be increased to 1920×1080.

A quality enhancement layer can be used to improve the Signal-to-Noise-Ratio (SNR) of the video. More particularly, a quality enhancement layer may include a greater number of bits to encode regions within an image. By combining a base layer and quality enhancement layer, the decoded virtual reality content may improve an image that appears blurred or fuzzy by providing greater detail.

For a given position or perspective of the user in relation to a virtual reality environment, there are multiple views that can be presented to the user depending on the current direction of viewing. For example, where the views correspond to the faces of a cube, there are typically 6 possible views from a given position. To generate a virtual reality environment, a base layer for one or more views (e.g., corresponding to faces of a cube, cylinder, or other three-dimensional shape) can be downloaded. In one implementation, all of the base layers for the different views can be downloaded to facilitate efficient display of the virtual reality environment. As will be described in further detail below, enhancement layer(s) can be downloaded and decoded to enhance the image represented by a given base layer.

As the user interacts with the virtual reality environment by changing his or her virtual position or perspective within the virtual reality environment, additional layers (e.g., additional base layer(s) and/or one or more enhancement layer(s)) can be downloaded and/or decoded. For example, a user may wear a virtual reality headset while exploring a virtual reality environment having a room that includes a door at the far end of the room. The user can explore the room by walking or moving his or her head. To simulate the user's experience as the user walks through the virtual room, as the user approaches the door, an enhancement layer can be combined with a base layer to improve the resolution of the view of the door or improve the visual quality of the view of the door.

In some instances, the user may change his or her location within the virtual reality environment by "node jumping." This may be occur, for example, where the user presses a button on a virtual reality device or moves his or her head while wearing a virtual reality headset. Additional layers including additional base layer(s) and/or enhancement layers may be downloaded and/or decoded to simulate the user's presence at this new location within the virtual reality environment.

In one implementation, content service 204 provides information pertaining to the fragments of the virtual reality content to client device 202. For example, content service 104 may provide a manifest file that indicates locations (e.g., URLs and/or byte offsets) at which the fragments or portions thereof can be accessed. Client device 202 can use the information to retrieve indices of the video fragments.

Logic 212 of client device 202 may selectively download frames of the video fragments from content service 204 and store the frames in memory 214 (or buffer). In one implementation, a predictive model predicts views most likely to be viewed next by the user. Thus, the predictive model may prioritize the possible views for downloading. For example, the predictive model may ascertain the possible paths (e.g., states) that the user may traverse within the virtual reality environment, and identify the views within those paths that have a high probability of being viewed next by the user. The possible paths may be represented by a tree or other suitable data structure. Frames may be downloaded (e.g., prefetched) and stored in memory 214 based, at least in part, on the probabilities that the corresponding views will be viewed next by the user. Stated another way, a download priority may be assigned to a view based, at least in part, on the probability that the view will be rendered by the client device (e.g., in response to a user's interaction with client device 202) within a particular period time. The frames that are downloaded can include base layer frames and/or enhancement layer frames. In this manner, a predictive model may be applied to select the frames to download, as well as determine the appropriate timing with which to download various frames.

A demultiplexer of client device 202 demultiplexes the frames and passes the frames to a decoder. In the implementation depicted in FIG. 2, the frames are passed to video decoder 216. Video decoder 216 decodes the frames to generate the corresponding digital images representing the various views of the virtual reality environment. Frame(s) associated with a given view may be decoded as they come into view of the user. In another implementation, logic 212 includes a predictive model that is applied to selectively decode frames (e.g., base layer frames and/or enhancement layer frames). A decode order may be assigned to the frames based, at least in part, on the order in which the user is likely to access the various views of the virtual reality environment and/or their relative importance (e.g., based upon angle distortion and/or other criteria). For example, as the user approaches the door within the virtual room, enhancement layer frame(s) can be decoded to improve the resolution and/or visual quality of the door based, at least in part on the angle of the view in relation to the user. Therefore, a predictive model may be applied to determine which frames to decode, as well as the timing with which the frames are to be decoded.

In this example, client device 202 decodes base layer frames A1, A2, A3 that are visible from the perspective of the user within a virtual reality environment such as a virtual room using video decoder 216 and the resulting digital images are displayed by client device 202. Client device 202 predicts the user's future movements within the virtual environment. For example, such a prediction may be based upon the direction that the user is facing or moving within the virtual environment, a speed with which the user is moving, sounds (e.g., noises or disturbances) that are perceived by the user within the virtual environment, sounds that the user may anticipate within the virtual environment, and/or the location or direction from which sounds are or may be transmitted within the virtual environment. Since the user is facing north in the direction of the door in the virtual room, client device 202 predicts that the user will choose to walk toward the door. Client device 202 downloads enhancement layer frames B2 and B3 to its frame buffer.

As the user interacts with the virtual reality environment by approaching the door within the virtual room, client device 202 decodes enhancement layer frame B2 using video codec 216 to enhance the resolution of an image including a representation of the door and decodes enhancement layer frame B3 using video codec 216 to enhance the visual quality of the image.

Figure 3:
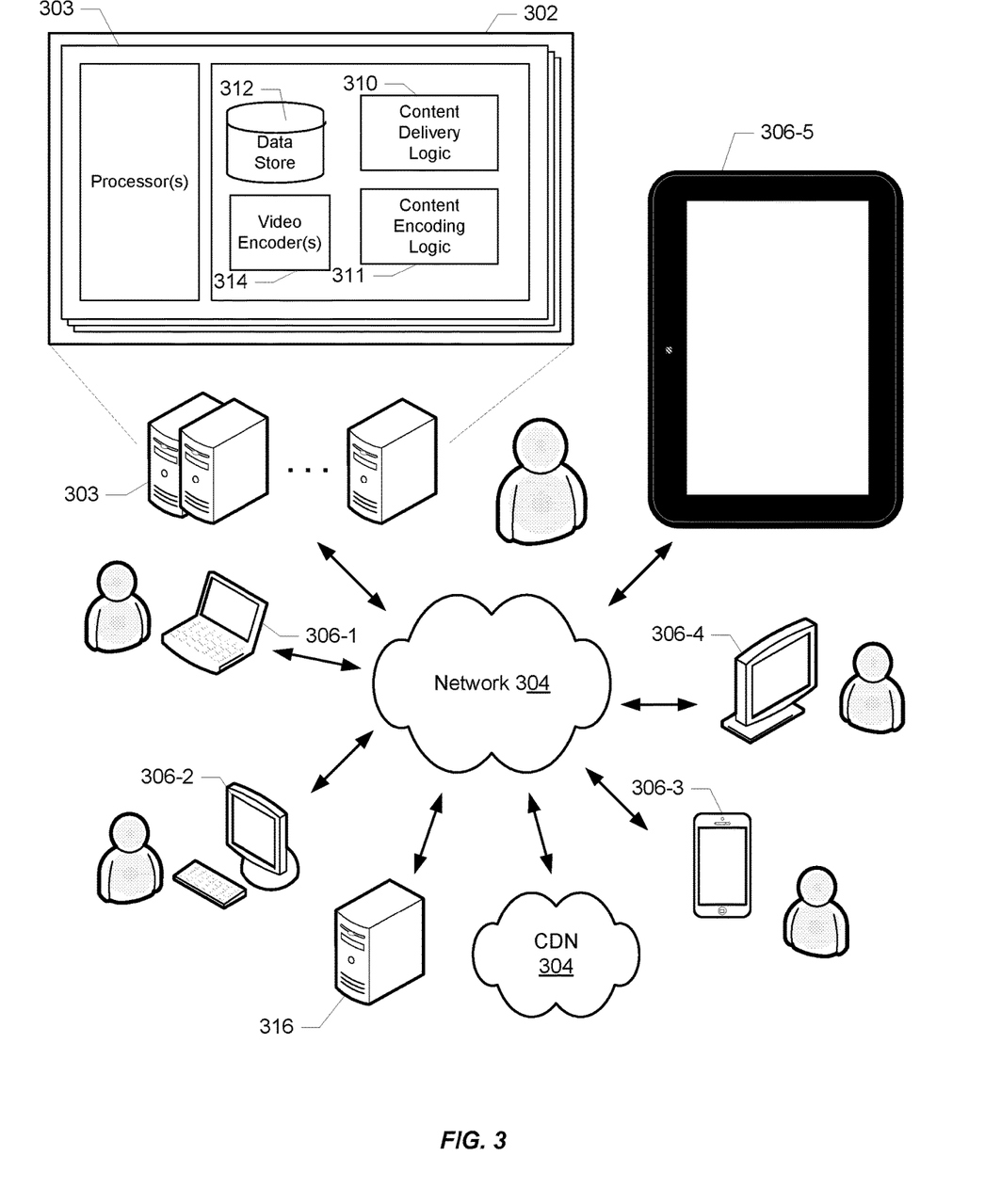
FIG. 3 is a simplified diagram of a computing environment in which various implementations may be practiced.

FIG. 3 illustrates an example of a computing environment in which a service 302 such as a content service provides virtual reality content via network 304 to a variety of client devices (306-1 through 306-5) in accordance with the techniques described herein. More particularly, the content may include virtual reality video-on-demand (VOD) content or broadcast content (e.g., 3D video of live events).

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of VOD or broadcast content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches, smart glasses, or virtual reality headsets), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 304) that may or may not be independent of content service 302. In addition, the source of the content may or may not be independent of content service 302 (e.g., as represented by content provider server 316).

Implementations enabled by the present disclosure contemplate logic and video decoder(s) resident on the client devices consuming content from content service 302; such logic and video decoder(s) being configured to download and decode frames of 3D virtual reality video files generated using a scalable coding technique as described herein and display the resulting images. The logic and/or decoder(s) might be part of an existing algorithm or module on the client device or implemented to work in conjunction with such an algorithm or module. The logic and/or decoder(s) might be implemented, for example, in a media player on the client device, as a browser plug-in, or as a separate application or module resident on the client device. Implementations are also contemplated in which, in addition to content delivery logic 310 (which facilitates various aspects of content delivery to client devices 306), content service 302 may include logic that facilitates at least some aspects of the encoding of content as described herein (e.g., as represented by content encoding logic 311). For example, encoding logic 311 might encode base layer frames and enhancement layer frames associated with virtual reality content according to a particular video encoding standard or multiple encoding standards. More particularly, encoding logic 311 can employ multiple video encoders, where each video encoder operates according to a different video encoding standard. As will be appreciated, video encoding can be implemented in software and/or hardware.

In this example, server 303 includes video encoder(s) 314 that include hardware configured to encode virtual reality video content according to one or more scalable encoding standards. In one implementation, encoding logic 311 and/or video encoder 314 is configured to encode virtual reality content according to a scalable encoding standard such as SHVC.

In addition to providing access to content, content service 302 may also include a variety of information related to the content (e.g., manifests or other metadata) in data store 312 to which service 302 provides access. Alternatively, such information about the content, as well as the content itself may be provided and/or hosted by one or more separate platforms, e.g., CDN 304. It should be noted that, while logic 310 and 311, video encoder 314, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
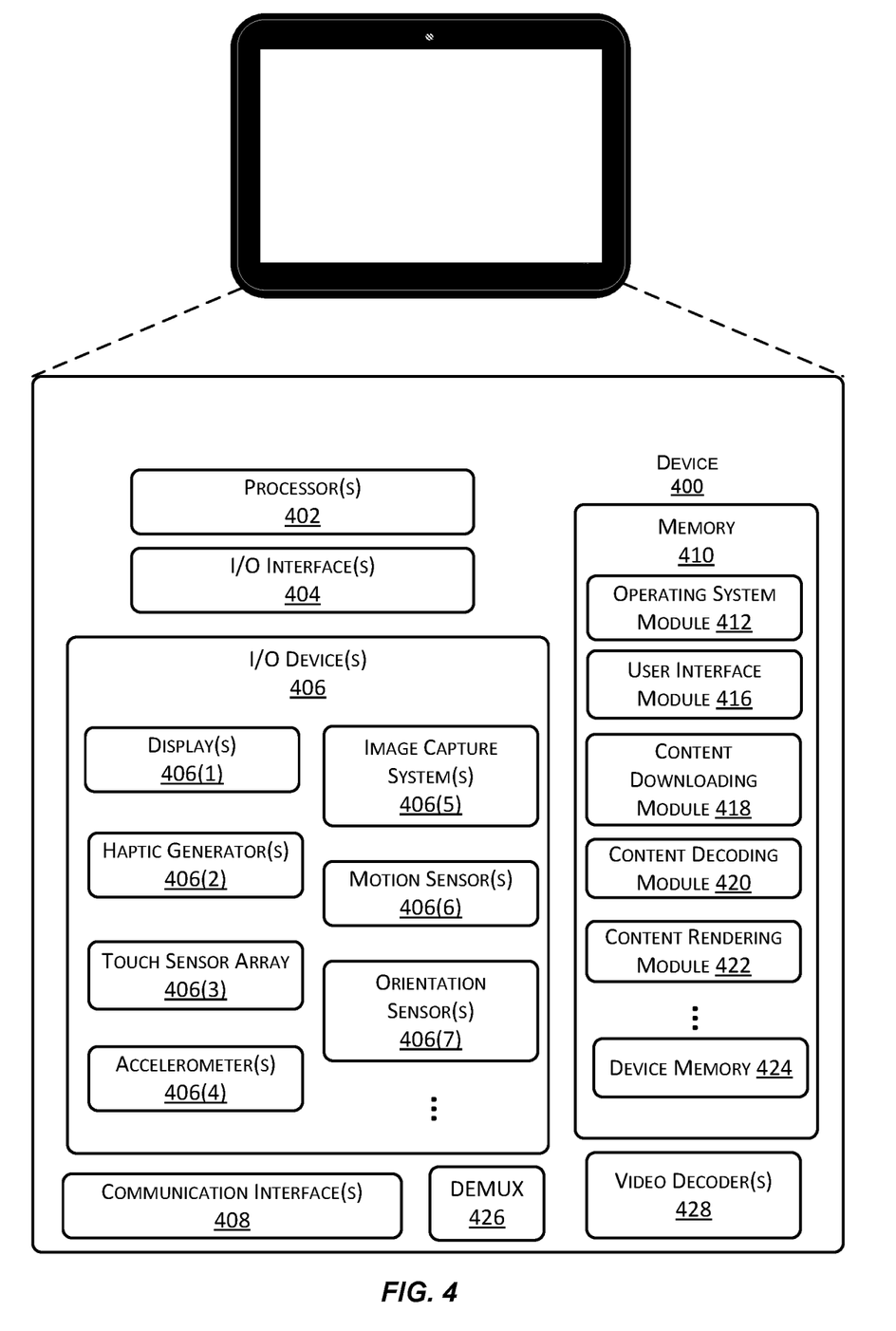
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-242 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, content downloading module 418, content decoding module 420, content rendering module 422, and other modules.

A demultiplexer (DEMUX) 426 demultiplexes frames of fragments and passes the demultiplexed frames to a decoder for decoding. Each decoder may be implemented in software and/or hardware.

Client device 400 can support a variety of video encoding standards. Decoding can be performed by a corresponding video decoder 428 that includes hardware (e.g., electrical components or a circuit) configured to decode frames of video content files according to a corresponding video encoding standard such as SHVC.

User interaction with the virtual reality environment via device 400 may be detected via one or more of the I/O devices 406. For example, a position or perspective of a user in relation to his or her virtual reality environment may be detected via haptic generator(s) 406(2), touch sensor array (s) (3), accelerometer(s) 406(4), image capture system(s) 406(5), motion sensor(s) 406(6), and/or orientation sensor(s) 406(7). Based upon the current position or perspective (e.g., angle) of the user within the virtual reality environment, device 400 may identify the next possible views of the user. More particularly, device 400 may ascertain a probability of a user viewing various possible views within a particular time frame. For example, the next possible views may be identified recursively along all possible paths to generate a tree or other suitable data structure, enabling the paths or views that are most likely to be selected next by the user (e.g., via interaction with the client device) to be identified.

Content downloading module 418 may apply a predictive model to selectively download base layer frames and/or enhancement layer frames. The downloading of both base layer frames and enhancement layer frames may be facilitated using the same predictive model or different predictive models. In some implementations, a predictive model may assign a download priority to base frame(s) and/or enhancement layer frame(s) based, at least in part, on the probability that the views will be viewed by the user within a particular period of time, the order that the corresponding views are likely to be viewed by the user, and/or the time that it takes to download content to the client device. The order that views are likely to be viewed by a given user (or the probability that various views will be accessed) may be determined based, at least in part, on the direction that the user is facing or moving within the virtual environment, a speed with which the user is moving, sounds (e.g., noises or disturbances) that are generated within the virtual environment, sounds that the user may anticipate within the virtual environment in the immediate future, and/or the location or direction from which sounds are or may be transmitted within the virtual environment. Thus, the predictive model may select specific frames to download, as well as when to download the frames.

In addition, content decoding module 420 may apply a predictive model to selectively decode frames that have previously been downloaded. The decoding of base layer frames and enhancement layer frames may be facilitated using the same predictive model or different predictive models. More particularly, a predictive model may assign a decode priority to views or associated frames within a frame buffer based, at least in part, on the probability that the views will be selected by the user within a particular period of time, the order that they are likely to be viewed by the user, a position or perspective of the user within the virtual reality environment, and/or an angle of distortion. Content rendering module 422 renders virtual reality content based on the decoded frames.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the downloading, decoding, and rendering of virtual reality content may be implemented in a variety of ways. For example, at least some of this functionality may be implemented as part of the code of a media player operating on device 400. Alternatively, at least some of this functionality may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other device types including, for example, virtual reality headsets may also be used. The scope of this disclosure should therefore not be limited by reference to device-specific details.

By using a scalable coding technique such as SHVC, it is possible to reduce the redundancy of encoded data by encoding a differential between two different frames. More particularly, a video bitstream contains a base layer and one or more enhancement layers. Each enhancement layer is added to the base layer to further enhance the quality of encoded video. More particularly, inter-layer prediction is used to remove redundancy across video layers. Enhancement layer predicted (P) frames can be predicted from a lower layer or from a previous frame in the same layer.

In accordance with various implementations, scalable coding is used to encode 3D virtual reality content. As described herein, enhancement layer frame(s) are used to enhance the resolution, visual quality, and/or frame rate of decoded video. Through the use of enhancement layer(s), 3D virtual content can be encoded and streamed using significantly fewer bits. The techniques described herein may be employed with any of a variety of video and audio encoding standards including, for example, SHVC.

Figure 5:
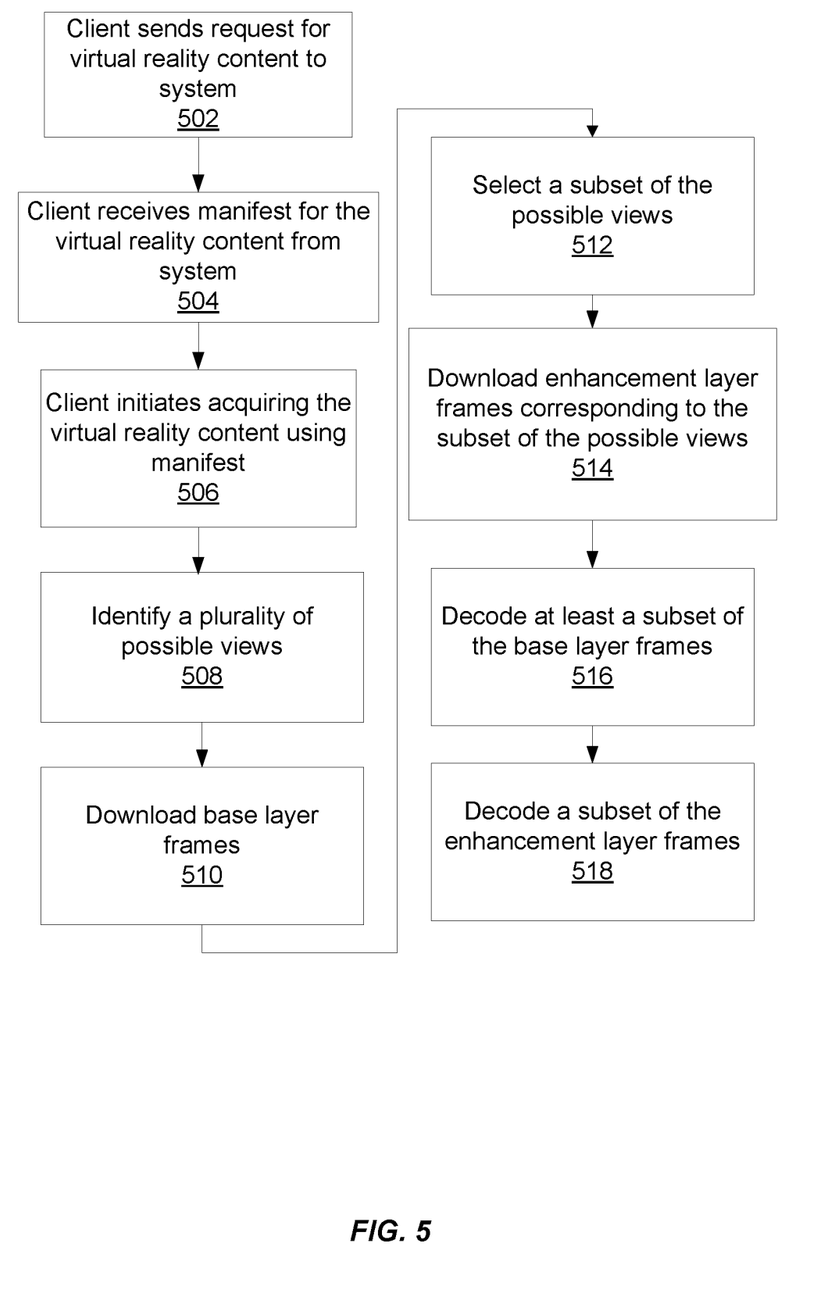
FIG. 5 is a flowchart illustrating a method of using a scalable coding technique to stream virtual reality content over a network according to a particular implementation.

FIG. 5 is a flowchart illustrating a method of using a scalable coding technique to stream virtual reality content over a network. A user may connect with a system offering a service such as a content service (or associated web site) via the Internet using a client device and browse a catalogue of virtual reality content items offered by the service.

Access to content over the Internet is typically governed by a digital rights management system such as Google's Widevine, Microsoft's PlayReady, Apple's FairPlay, or Sony's OpenMG to name a few representative examples. Content may be encrypted using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 5, the user may connect to the system by completing a login process using the client device and, after selecting virtual reality content from the catalogue of virtual reality content items, the client device sends a request to the system for virtual reality content (502). For example, the virtual reality content may be a 3D virtual reality video that enables the user to walk through a house that is being offered for sale. As another example, the virtual reality content may be a 3D virtual reality game that enables the user to fly a plane and shoot at alien space ships.

The system provides the client device with a manifest that the client device can use to acquire selected frames of the fragments (also referred to as a group of pictures or GOP) of the video content file(s) that include the virtual reality content (504).

The client device can initiate acquiring the virtual reality content of the video content file(s) using the manifest received from the system (506). More particularly, the client device can download frames using the manifest and/or metadata maintained externally from the manifest. For example, the client device can download frames using fragment indices of fragment(s) of the video content file(s). The client device may store the frames as they are acquired.

In one implementation, for each fragment, the client device may use the fragment's index to determine the frames of the fragment, the reference hierarchy (e.g., representing the dependencies between or among frames), and the offset of each frame in the fragment. For example, the index may be in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

The manifest, fragment index, and/or associated metadata may be used to identify a particular view, base layer or enhancement layer(s) for the view, and/or frames within the corresponding layer. For example, the manifest or fragment index may indicate the location (e.g., offset) of base layer frames or enhancement layer frames within the fragment for a particular view. In one implementation, for each fragment, the manifest may identify specific views, as well as byte ranges for each base layer and enhancement layer(s).

An enhancement layer for a given view depends upon frames within a base layer for the same view. Similarly, where there are multiple enhancement layers for a given view, each enhancement layer depends upon frames in lower enhancement layer(s). Within a given enhancement layer, frames may also have dependencies upon other frames within that enhancement layer. While it is possible to identify dependencies within a reference hierarchy in real-time, this can be a time-consuming process that can introduce visual artifacts.

In accordance with one implementation, the manifest, fragment index, or associated metadata may indicate, for an enhancement layer, one or more switch points within the enhancement layer. For example metadata identifying switch points may be maintained in a separate micro-manifest file. A switch point may identify, within an enhancement layer, the next frame that does not depend on any other frames within that layer. In other words, each switch point identifies an enhancement layer frame that has no dependencies on other frames. Stated another way, each switch point identifies an enhancement layer frame that is not dependent on previous frames within a sequence of frames. Through the use of switch points, enhancement layer frames may be selectively downloaded and decoded as the user shifts position or perspective within their virtual environment. In this manner, it is possible to identify, for a particular view, the next enhancement layer frame to be downloaded or decoded without visual artifacts.

A change in position or perspective (e.g., viewing angle) of a user in relation to their virtual environment may be detected by the client device via input received or detected via sensors such as touch sensor array(s), accelerometer(s), image capture system(s), a motion sensor(s), orientation sensor(s), and/or a microphone. Upon detecting the change in position or perspective, the client device can identify views that are most pertinent to the user's current position/perspective. For example, the client device may download and/or decode frames of the views that are currently in view of the user within the virtual environment. As another example, the client device may download and/or decode frames of the views that have a high probability of being selected by the user within a period of time.

A plurality of possible views of the virtual reality content may be identified (508). Possible views within the virtual reality environment may include, for at least one position or perspective within the virtual reality environment, multiple views (e.g., corresponding to all of the faces of the three-dimensional cube or cylinder). The possible views may pertain to the current position/perspective. In addition, the possible views may pertain to views that have a high probability of being selected within a particular period of time. In one implementation, the possible views pertain to all positions/perspectives within the virtual reality environment.

The client device can download a plurality of base layer frames of the virtual reality content (510), where each of the base layer frames corresponds to a different view, as will be described in further detail below.

A subset of the possible views may be selected (512). The subset of the possible views may be selected based, at least in part, on a current position or perspective of the user in relation to the virtual reality environment. More particularly, the subset of the possible views may be selected based, at least in part, on input received or detected via the client device. For example, the views that are selected may include the views that are currently in view and/or those that have a high probability of being rendered (e.g., selected by the user) within a particular period of time.

Enhancement layer frames of the virtual reality content that correspond to the selected views may be downloaded (514). More particularly, only a subset of the enhancement layer frames corresponding to all of the possible views are downloaded.

A demultiplexer of the client device passes frames of the fragments of the video content file(s) to a video decoder configured to decode frames according to a scalable encoding standard such as SHVC. Frames may be passed to the video decoder as they are downloaded. Alternatively, frames may be obtained from a frame buffer.

The client device may decode only a fraction of the frames that have been downloaded. More particularly, the client device may decode at least a subset of the base layer frames (516). Generally, the client device will decode only a subset of the enhancement layer frames (518).

As the decoder decodes frames of the video content file(s), digital images generated as a result of decoding the frames are displayed. For example, the client device may decode the base layer frame and enhancement layer frame(s) corresponding to the same view, and a digital image generated as a result of decoding the base layer frame and enhancement layer frame(s) may be rendered.

Figure 6:
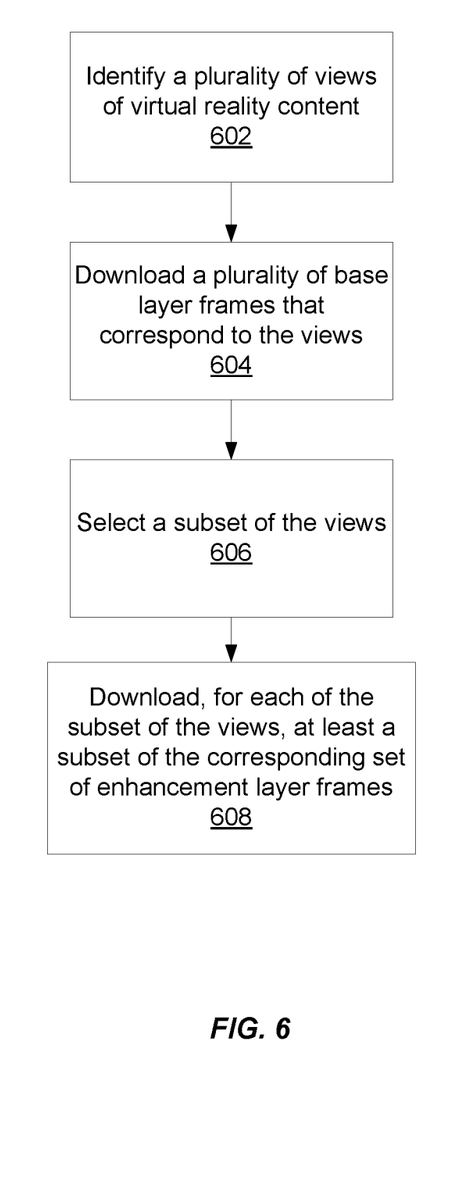
FIG. 6 is a flowchart illustrating a method of using a scalable coding technique to download virtual reality content.

FIG. 6 is a flowchart illustrating a method of using a scalable coding technique to download virtual reality content. As discussed above, the virtual reality content may include, for each view, a base layer and corresponding enhancement layer(s). Thus, each view may have a corresponding set of enhancement layer frames, which may include one or more temporal enhancement layer frames, one or more spatial enhancement layer frames, and/or one or more quality enhancement layer frames.

The client device identifies a plurality of views of virtual reality content (602), as described above. The client device downloads a plurality of base layer frames of the virtual reality content (604). As described above, each of the base layer frames may correspond to a different view of the identified views of the virtual reality content. For a given view, the client device can download a base layer frame corresponding to the view using the manifest or one of the fragment indices. Multiple base layer frames corresponding to different views may be downloaded, enabling two or more views to be combined to generate a 3D image for display. The views for which base layer frames are downloaded may include views that are currently visible to the user from the user's current position/perspective. In addition, the views for which base layer frames are downloaded may include views that are likely to be visible to the user within a particular period of time. In one implementation, the views for which base layer frames are downloaded include all possible views (e.g., associated with all possible user positions/perspectives).

The client device selects a subset of the views for which to download enhancement layer frames (606), as described above. The client device downloads, for each view of the subset of the views, at least a subset of the corresponding set of enhancement layer frames such that a plurality of enhancement layer frames are downloaded (608). More particularly, the client device can download enhancement layer frame(s) for a view using the fragment indices, the manifest, or associated metadata, which may be maintained in a separate file or data structure.

For a given view, the client device can select enhancement layer frames from one or more enhancement layers to download. In one implementation, the enhancement layer frames may be selected based, at least in part, on switch points within an enhancement layer as identified within the manifest, fragment index, or other metadata. In this manner, the next enhancement layer frame without dependencies on other frames within the enhancement may be identified.

In one implementation, the client device downloads the base layer frames for views associated with a current position/perspective of the user, but only downloads a subset of the enhancement layer frames associated with the views. For example, the views associated with the current position/perspective of the user may include all views associated with a given position/perspective (e.g., for all faces of the cube), those views that are visible from a given position/perspective (e.g., views that are currently displayed), all views that are possible from that position/perspective within a particular period of time, or views that are likely to be displayed within a particular period of time.

The client device may download enhancement layer frames associated with only a subset of the views associated with the current position/perspective of the user. Moreover, the client device may download only a subset of the enhancement layer frames associated with a particular view. In one implementation, the client device may download enhancement layer frame(s) associated with the currently displayed views and/or views that have a high probability of being displayed within a particular period of time.

One or more predictive models may be applied to selectively download frames including base layer frames and/or enhancement layer frames. For example, the client device may determine those view(s) that have the highest probability of being accessed next by the user (e.g., by changing his or her location or perspective within the virtual reality environment). Frames may be prioritized for downloading based, at least in part, on the probability that the corresponding view will be accessed next by the user, the position or perspective of the user, an angle of distortion, response time, network conditions, and/or other criteria.

The client device can request a portion of a fragment by requesting a particular byte range within a fragment. For example, a byte range may be requested by specifying a starting address and an offset. The client device may track the portions of the fragments that have been downloaded. Prior to downloading a portion of a fragment, the client device may determine whether the desired frames are in a frame buffer. Where the desired frames have not previously been downloaded, the client device may download the frames and store the frames in its frame buffer.

By selectively downloading frames that are most pertinent to the position and perspective of the user within the virtual reality environment, the amount of data that is streamed over the Internet to a client device may be significantly reduced. Furthermore, by implementing enhancement layers, the amount of data that is downloaded to generate 3D virtual reality video may be minimized.

Figure 7:
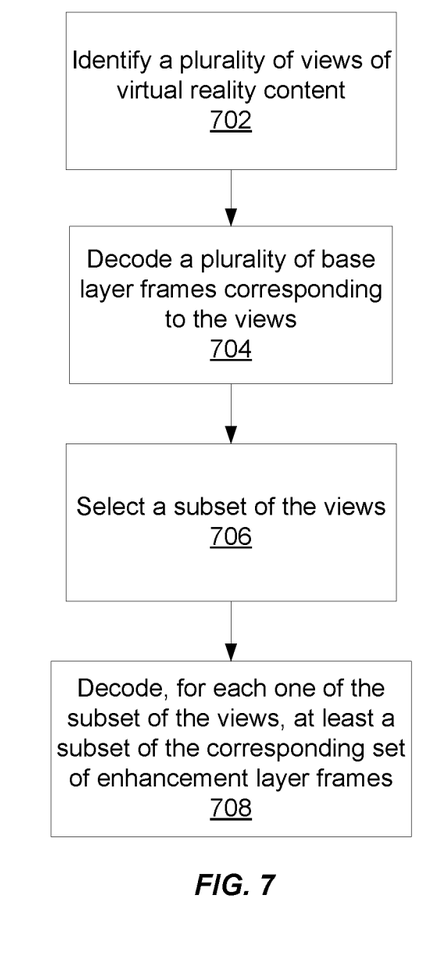
FIG. 7 is a flowchart illustrating a method of using a scalable coding technique to decode virtual reality content.

FIG. 7 is a flowchart illustrating a method of using a scalable coding technique to decode virtual reality content. The client device identifies a plurality of views of virtual reality content (702), as described above. The client device decodes a plurality of base layer frames corresponding to the views (704). Each of the base layer frames may correspond to a different view of the virtual reality content.

The client device selects a subset of the views (706), where each view has a set of enhancement layer frames associated therewith. More particularly, the client device selects a subset of the views for which to decode enhancement layer frames.

For each view in the selected subset of views, the client device decodes at least a subset of the corresponding set of enhancement layer frames (708). More particularly, for a given view, the client device can select one or more enhancement layer frames from at least one enhancement layer to decode. In one implementation, the enhancement layer frames within an enhancement layer may be selected based, at least in part, on switch points identified within the manifest, fragment index, or other metadata. Through the identification of the next switch point for an enhancement layer, it is possible to identify the next enhancement layer frame that can be fully decoded without visual artifacts.

In one implementation, the client device may decode frames that pertain to those views that have recently been selected by the user (e.g., the views that are currently in view). In addition, the client device may decode frames that have a high probability of being selected by the user within a particular period of time.

Frames including base layer frames and/or enhancement layer frames may be selected for decoding according to one or more predictive models. For example, a predictive model may select frames for decoding based, at least in part, on the probability that the corresponding views will be accessed next by the user (e.g., within a particular period of time), the position or perspective of the user (e.g., views that are currently in view or recently selected), angle of distortion, and/or other criteria. The information used by the predictive model to select frames for decoding is likely to be different from the information used by the predictive model to select frames to download. In some implementations, the predictive model and information used to select base layer frames for decoding is different from the predictive model and information used to select enhancement layer frames for decoding.

By selectively decoding frames that are most pertinent to the position and perspective of the user within the virtual reality environment and the ability to separately decode base and enhancement layers, the amount of data that is decoded to generate 3D virtual reality video may be minimized. In this manner, the performance of a video decoder may be optimized to render virtual reality content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   identifying, by a client device using a manifest, a plurality of views of virtual reality content, the plurality of views including, for at least one position within a virtual reality environment, multiple views, wherein each of the multiple views corresponds to a different one of a plurality of faces of a virtual three-dimensional cube or cylinder;
   downloading, by the client device using the manifest, a plurality of base layer frames of the virtual reality content such that the base layer frames are stored in a memory of the client device, each of the base layer frames corresponding to a different view of the views;
   downloading, by the client device using the manifest, for each of the views, a set of one or more enhancement layer frames such that a plurality of enhancement layer frames of the virtual reality content are stored in the memory of the client device, wherein the set of enhancement layer frames include at least one of: a temporal enhancement layer frame, a spatial enhancement layer frame, or a quality enhancement layer frame;
   decoding, by a decoder of the client device, the base layer frames, the views not being visible from a current position within the virtual reality environment;
   prioritizing the plurality of views according to a prediction model such that priorities are assigned to the plurality of views based, at least in part, on a plurality of probabilities that each indicates a likelihood that a corresponding view of the plurality of views will be selected within a particular period of time;
   selecting a subset of the views based, at least in part, on the corresponding priorities; and
   decoding, by the decoder of the client device, for each one of the subset of the views, at least a subset of the corresponding set of enhancement layer frames.

2. The method as recited in claim 1, wherein each set of enhancement layer frames comprises one or more of: a temporal enhancement layer frame, a spatial enhancement layer frame, or a quality enhancement layer frame.

3. The method as recited in claim 1, further comprising:
   selecting the subset of the enhancement layer frames based, at least in part, on switch points indicated within metadata associated with the virtual reality content.

4. The method as recited in claim 3, wherein the metadata associated with the virtual reality content comprises a manifest, a fragment index, or a file that is distinct from both the manifest and the fragment index.

5. The method as recited in claim 1, further comprising:
   detecting input via at least one of: a touch sensor array, an accelerometer, an image capture system, a motion sensor, an orientation sensor, or a microphone;
   wherein selecting the subset of the enhancement layer frames is performed based, at least in part, on the input detected via the client device.

6. A method, comprising:
   identifying, by a client device using a manifest, a plurality of views of virtual reality content, the plurality of views not being visible from a current position within the virtual reality environment;
   decoding, by a decoder of the client device, a plurality of base layer frames of the virtual reality content, each of the base layer frames corresponding to a different view of the plurality of views of the virtual reality content, the virtual reality content including for each of the views a corresponding set of enhancement layer frames;
   prioritizing the plurality of views according to a prediction model such that priorities are assigned to the plurality of views based, at least in part, on a plurality of probabilities that each indicates a likelihood that a corresponding view of the plurality of views will be selected within a particular period of time;
   selecting, by the client device, a subset of the views based, at least in part, on the corresponding priorities; and
   decoding, by the decoder of the client device, for each one of the subset of the views, at least a subset of the corresponding set of enhancement layer frames.

7. The method as recited in claim 6, further comprising:
   selecting, for each one of the subset of the views, the subset of the corresponding set of enhancement layer frames of the virtual reality content based, at least in part, on switch points indicated within metadata associated with the virtual reality content.

8. The method as recited in claim 7, wherein the metadata associated with the virtual reality content comprises a manifest, a fragment index, or a file that is distinct from both the manifest and the fragment index.

9. The method as recited in claim 6, further comprising:
   obtaining input received or detected via one or more input/output (I/O) devices; wherein selecting the subset of the views is performed based, at least in part, on the input that is received or detected via the I/O devices.

10. The method as recited in claim 6, wherein the plurality of views comprise, for each position within the virtual reality environment, multiple views, wherein each of the multiple views corresponds to a different one of a plurality of faces of a virtual three-dimensional cube or cylinder.

11. The method as recited in claim 6, wherein identifying the plurality of views comprises:

selecting the plurality of views such that the views include at least one of: a current view or a set of views that have a high probability of being selected within a particular period of time.

12. The method as recited in claim 6, wherein each set of enhancement layer frames comprises one or more of: a temporal enhancement layer frame, a spatial enhancement layer frame, or a quality enhancement layer frame.

13. A computing device, comprising:
one or more processors and memory configured to:
identify a plurality of views of virtual reality content using a manifest, the plurality of views not being visible from a current position within the virtual reality environment;
decode a plurality of base layer frames of the virtual reality content, each of the base layer frames corresponding to a different view of the plurality of views of the virtual reality content, the virtual reality content including for each of the views a corresponding set of enhancement layer frames;
prioritize the plurality of views according to a prediction model such that priorities are assigned to the plurality of views based, at least in part, on a plurality of probabilities that each indicates a likelihood that a corresponding view of the plurality of views will be selected within a particular period of time;
select a subset of the views based, at least in part, on the corresponding priorities; and
decode, for each one of the subset of the views, at least a subset of the corresponding set of enhancement layer frames.

14. The computing device as recited in claim 13, the processors and memory being further configured to:
obtain input received or detected via one or more input/output (I/O) devices; and
select the subset of the views based, at least in part, on the input that is received or detected via the I/O devices.

15. The computing device as recited in claim 13, the processors and memory being further configured to:
select the views such that the views include at least one of: a current view or a set of views that have a high probability of being selected within a particular period of time.

16. The computing device as recited in claim 13, the processors and memory being further configured to:
select, for each one of the subset of the views, the subset of the corresponding set of enhancement layer frames of the virtual reality content based, at least in part, on switch points indicated within metadata associated with the virtual reality content.

17. The computing device as recited in claim 13, wherein the plurality of views comprise, for at least one position within the virtual reality environment, multiple views, wherein each of the multiple views corresponds to a different one of a plurality of faces of a virtual three-dimensional cube or cylinder.

18. The computing device as recited in claim 13, wherein each set of enhancement layer frames comprises one or more of: a temporal enhancement layer frame, a spatial enhancement layer frame, or a quality enhancement layer frame.

19. The method as recited in claim 1, wherein downloading and decoding the plurality of base layer frames of the virtual reality content are performed while the plurality of views are not visible.

* * * * *